US009773321B2

(12) United States Patent
Hong et al.

(10) Patent No.: US 9,773,321 B2
(45) Date of Patent: Sep. 26, 2017

(54) VISUAL REPRESENTATIONS OF DISTANCE CARTOGRAMS

(71) Applicant: University of Washington, Seattle, WA (US)

(72) Inventors: Sungsoo Hong, Seattle, WA (US); Cecilia Aragon, Seattle, WA (US); Min-Joon Yoo, New York, NY (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 15/174,791

(22) Filed: Jun. 6, 2016

(65) Prior Publication Data

US 2016/0358021 A1 Dec. 8, 2016

Related U.S. Application Data

(60) Provisional application No. 62/171,842, filed on Jun. 5, 2015.

(51) Int. Cl.
*G06T 7/20* (2017.01)
*G06T 7/60* (2017.01)
(Continued)

(52) U.S. Cl.
CPC ........... *G06T 7/60* (2013.01); *G01C 21/34* (2013.01); *G06T 11/20* (2013.01); *G09B 29/007* (2013.01); *G06Q 10/047* (2013.01)

(58) Field of Classification Search
CPC .... G01C 21/26; G01C 21/34; G01C 21/3476; G01C 21/00; G01C 21/32; G01C 21/3682; G06F 17/30241; G06T 11/60
See application file for complete search history.

(56) References Cited

U.S. PATENT DOCUMENTS 6,853,386 B1 * 2/2005 Keim ..................... G09B 29/00
345/441
7,737,998 B1 * 6/2010 Keim ..................... G09B 29/00
345/441

(Continued)

OTHER PUBLICATIONS

A. C. Gatrell (Jan. 1991) "Concepts of space and geographical data," in Geographical Information Systems: Principles and Applications, pp. 119-134.

(Continued)

*Primary Examiner* — Zhengxi Liu
*Assistant Examiner* — Raffi Isanians
(74) *Attorney, Agent, or Firm* — Perkins Coie LLP

(57) ABSTRACT

Technology for generating high perceptual-quality distance cartograms, which use geo-contextual anchors to avoid topological violations, is disclosed. A system can calculate the travel times between a selected origin of the graph, and other locations within the graph based on a graph describing the transportation network within a region (e.g., an urban setting) and data describing travel conditions. Other nodes are then shifted such that the distances between them and the origin are reflective of the travel times between them. When a shifted node violates the topology of the transportation network, which hamper a user's ability to utilize a map due to disruptions in the physical relations between adjacent nodes and map overlaps, the node is instead placed at an alternate location that does not result in a violation. A graphical projection, or geo-contextual anchor, is then generated that indicates where the node would be located but-for the violation.

19 Claims, 10 Drawing Sheets

(51) Int. Cl.
G06T 11/20 (2006.01)
G01C 21/34 (2006.01)
G09B 29/00 (2006.01)
G06Q 10/04 (2012.01)

(56) References Cited

U.S. PATENT DOCUMENTS

| | | | | |
|---|---|---|---|---|
| 8,095,307 | B2* | 1/2012 | Ebert | G01C 21/3635 |
| | | | | 340/995.14 |
| 8,786,605 | B1* | 7/2014 | Curtis | G06Q 10/06 |
| | | | | 340/995.1 |
| 8,886,715 | B1* | 11/2014 | Zhu | H04L 67/2847 |
| | | | | 701/430 |
| 9,261,376 | B2* | 2/2016 | Zheng | G01C 21/3484 |
| 9,341,486 | B2 | 5/2016 | Aragon et al. | |
| 2006/0085123 | A1 | 4/2006 | Sugita et al. | |
| 2006/0146719 | A1* | 7/2006 | Sobek | G01C 21/20 |
| | | | | 370/238 |
| 2006/0220923 | A1 | 10/2006 | Tanizaki et al. | |
| 2007/0027621 | A1 | 2/2007 | Operowsky et al. | |
| 2008/0243584 | A1 | 10/2008 | Srinivasan et al. | |
| 2011/0141115 | A1* | 6/2011 | Brandes | G09B 29/007 |
| | | | | 345/428 |
| 2011/0276259 | A1 | 11/2011 | Nortrup et al. | |
| 2012/0209524 | A1 | 8/2012 | Okude et al. | |
| 2012/0283948 | A1 | 11/2012 | Demiryurek et al. | |
| 2014/0005931 | A1 | 1/2014 | Ono et al. | |
| 2016/0350507 | A1* | 12/2016 | Guerin | G06F 19/3443 |

OTHER PUBLICATIONS

A. M. MacEachren (2001; accessed Dec. 2016) "An evolving cognitive-semiotic approach to geographic visualization and knowledge construction," Information Design Journal, 10(1):26-36.
A. M. MacEachren (Feb. 1980) "Travel time as the basis of cognitive distance," The Professional Geographer, 32(1):30-36.
B. Camper (accessed Jul. 2016) "Mapzen Vector Tile Service," available online at: https://github.com/mapzen/vector-datasource/wiki/Mapzen-Vector-Tile-Service.
B. Jenny (Dec. 2012) "Adaptive Composite Map Projections," IEEE Transactions on Visualization and Computer Graphics, 18(12):2575-2582.
B. N. Hilton et al. (Jan. 2011) "SafeRoadMaps: Communication of location and density of traffic fatalities through spatial visualization and heat map analysis," Information Visualization, 10(1):82-96.
B. Tversky et al. (Oct. 2002) "Animation: can it facilitate?" International Journal of Human-Computer Studies, 57(4):247-262.
C.J. Kocmoud (Dec. 1997) "Constructing Continuous Cartograms: A Constraint-Based Approach," Master's Thesis, College Station: Texas A&M University.
C.J. Kocmoud and D.H. House (1998; accessed Jul. 2016) "A Constraint-Based Approach to Constructing Continuous Cartograms," in Proceedings of the 12th International Symposium on Spatial Data Handling, pp. 236-246.
D. A. Keim et al. (Jan./Feb. 2004) "CartoDraw: A fast algorithm for generating contiguous cartograms," IEEE Transactions on Visualization and Computer Graphics, 10(1):95-110.
D. F. L. Dorling (Sep. 1991) "The visualisation of spatial social structure," Ph.D. Thesis, University of Newcastle upon Tyne, 577 pp.
D. M. Mark (1999; accessed Jul. 2016) "Spatial representation: a cognitive view," in Geographical Information Systems: Principles and Applications, 1:81-89.
G. Lyons and J. Urry (Feb.-Mar. 2005) "Travel time use in the information age," Transportation Research Part A: Policy and Practice, 39(2):257-276.
G. Wahba (1990; accessed Nov. 2016) "Spline Models for Observational Data," Society for Industrial and Applied Mathematics, Philadelphia, Pennsylvania, 174 pp.

GitHub (accessed Jul. 2016) "JavaScript library to create Thin-Plate-Splines from control points," available online at: https://github.com/tilemapjp/ThinPlateSplineJS.
H. Yang and M. G. H. Bell (1998; epub Mar. 2007) "Models and algorithms for road network design: a review and some new developments," Transport Reviews, 18(3):257-278.
J. E. Spinney (Oct. 2003) "Mobile positioning and LBS applications," Geography, 88(4):256-265.
J. Hadlaw (Winter 2003) "The London Underground Map: Imagining Modern Time and Space," Design Issues, 19(1):25-35.
J. Heer and G. G. Robertson (Nov.Dec. 2007) "Animated transitions in statistical data graphics," IEEE Transactions on Visualization and Computer Graphics, 13(6):1240-1247.
J. Mackinlay (Apr. 1986) "Automating the design of graphical presentations of relational information," ACM Transactions on Graphics (TOG), 5(2):110-141.
K. Church and B. Smyth (Feb. 2009) "Understanding the intent behind mobile information needs," Proceedings of the 14th International Conference on Intelligent User Interfaces (IUI '09), pp. 247-256.
KP Goldsberry (Sep. 2007) "Real-Time Traffic Maps," Ph.D Thesis, University of California Santa Barbara, 191 pp.
L. Colligan et al. (Jul. 2015) "Cognitive workload changes for nurses transitioning from a legacy system with paper documentation to a commercial electronic health record," International Journal of Medical Informatics, 84(7):469-476.
M. De Berg et al. (Apr. 2010) "Optimal BSPs and rectilinear cartograms," International Journal of Computational Geometry & Applications, 20(2):203-222.
M. J. Lobo et al. (Apr. 2015) "An evaluation of interactive map comparison techniques," Proceedings of the 33rd ACM Conference on Human Factors in Computing Systems, pp. 3573-3582.
M. T. Gastner and M. E. Newman (May 2004) "Diffusion-based method for producing density-equalizing maps," Proceedings of the National Academy of Sciences USA, 101(20):7499-7504.
N. Kadmon (Oct. 1982) "Cartograms and topology," Cartographica: The International Journal for Geographic Information and Geovisualization, 19(3-4):1-17.
O. Karlin (Nov. 2005; accessed Jul. 2016) "Time Travel," available online at: http://oskarlin.com/2005/11/29/timetravel.
P. Burnett (1978; accessed Jul. 2016) "Time Cognition and Urban Travel Behavior," Geografiska Annaler. Series B. Human Geography, 60(2):107-115.
R. Cabello (accessed Jul. 2016) "three.js," available online at: http://threejs.org.
R. Goldman (Jan. 1990) "Intersection of two lines in three-space.," in Graphics Gems, Academic Press Professional, Inc., p. 304.
R. Gouveia et al. (Sep. 2015) "How do we engage with activity trackers?: a longitudinal study of Habito," Proceedings of the 15th ACM International Joint Conference on Pervasive and Ubiquitous Computing (UbiComp '15), pp. 1305-1316.
R. Inoue and E. Shimizu (Nov. 2009) "A New Algorithm for Distance Cartogram Construction," International Journal of Geographical Information Science, 23(11):1453-1470.
S. Angel and G.M. Hyman (Oct. 1972) "Transformations and geographic theory," Geographical Analysis, 4(4):350-367.
S. Bies and M. Van Kreveld (2013; accessed Dec. 2016) "Time-Space Maps from Triangulations," in W. Didimo and M. Patrignani (eds), Graph Drawing, GD 2012, Lecture Notes in Computer Science, Springer: Berlin, Heidelberg, 7704:511-516.
S. Burigat and L. Chittaro (2007; accessed Jul. 2016) "Geographical Data Visualization on Mobile Devices for Useer's Navigation and Decision Support Activites," in Spatial Data on the Web, Springer: Heidelberg, pp. 261-284.
S. G. Hart (2006; accessed Jul. 2016) "NASA-Task Load Index (NASA-TLX); 20 Years Later," Proceedings of the Human Factors and Ergonomics Society 50th Annual Meeting, pp. 904-908.
S. M. Guseyn-Zade and V. S. Tikunov (1994; epub May 2013) "Numerical methods in the compilation of transformed images," Mapping Sciences and Remote Sensing, 31(1):66-85.
S. Openshaw (Jan. 1991) "Developing appropriate spatial analysis methods for GIS," in Geographical Information Systems: Principles and Applications, pp. 389-402.

(56) References Cited

OTHER PUBLICATIONS

S. R. Hong et al. (Apr.-May 2014) "Traffigram: Distortion for Clarification via Isochronal Cartography," Proceedings of the SIGCHI Conference on Human Factors in Computing Systems (CHI 2014), pp. 907-916.
SE Battersby et al. (2014; accessed Jul. 2016) "Implications of web Mercator and its use in online mapping," Cartographica: The International Journal for Geographic Information and Geovisualization, 49(2):85-101.
T. Cardon and M. Migurski (accessed Jul. 2016) "Squares," available online at: https://github.com/migurski/Squares.
T. Reichenbacher (Jan. 2004) "Mobile Cartography: Adaptive Visualisation of Geographic Information on Mobile Devices," Dissertation for Doctorate of Natural Sciences (Verlag Dr. Hut.), Technical University of Munich, 189 pp.
V. Venkatesh and F. D. Davis (Feb. 2000) "A theoretical extension of the technology acceptance model: Four longitudinal field studies," Management Science, 46(2):186-204.
W. Bunge (1960; accessed Dec. 2016) "Theoretical geography," Ph.D. Thesis, Seattle: University of Washington, 253 pp.
W. Cartwright (2015; epub Jun. 2014) "Rethinking the definition of the word 'map': an evaluation of Beck's representation of the London Underground through a qualitative expert survey," International Journal of Digital Earth, 8(7):522-537.
W. R. Tobler (1961; accessed Nov. 2016) "Map transformations of geographic space," Ph.D Thesis, Seattle: University of Washington, 196 pp.
W. R. Tobler (Mar. 2004) "Thirty Five Years of Computer Cartograms," Annals of the Association of American Geographers, 94(1):58-73.
W. Warntz (Jan. 1967) "Global science and the tyranny of space," Papers in Regional Science, 19(1):7-19.
W.S. Cleveland and R. McGill (Sep. 1984) "Graphical Perception: Theory, Experimentation, and Application to the Development of Graphical Methods," Journal of the American Statistical Association, 79(387):531-554.
Wikipedia (accessed Nov. 2016) "Cartogram," available online at: http://en.wikipedia.org/wiki/Cartogram.
Z. Li (2015; epub Jan. 2016) "General Principles for Automated Generation of Schematic Network Maps," The Cartographic Journal, 52(4):356-360.
A.M. Maceachren. "Visualization in Modern Cartography: Setting the Agenda," in Visualization in Modern Cartography, Pergamon, New York, pp. 1-12 (1994).
D. Dorling et al. "Worldmapper: The world as you've never seen it before," IEEE Transactions on Visualization and Computer Graphics, 12(5):757-764 (2006).
D. Nekrasovski et al. "An Evaluation of Pan & Zoom and Rubber Sheet Navigation with and without an Overview," Proceedings of ACM Special Interest Group on Computer-Human Interaction (SIGCHI) Conference on Human Factors in Computing Systems, pp. 11-20 (200.
D. Tiesyte and C.S. Jensen. "Similarity-based prediction of travel times for vehicles traveling on known routes," in Proceedings of the 16th ACM Special Interest Group on Spatial Information (SIGSPATIAL) International Conference on Advances in Geographic I.
D. Yamamoto et al. "Focus+Glue+Context: An Improved Fisheye Approach for Web Map Services," in Proceedings of the 17th ACM Special Interest Group on Spatial Information (SIGSPATIAL) International Conference on Advances in Geographic Information Systems, pp.
Donato, et al. "Approximate Thin Plate Spline Mappings", accessed Sep. 18, 2015.
E.W. Dijkstra. "A note on two problems in connection with graphs," in Numerische Mathematik, 1:269-271, (1959).
Google. "Google GLASS," available at: http://www.google.com/glass/start (2012).
H. Brainerd and A. Pang. "Floating Ring: A New Tool for Visualizing Distortion in Map Projections," Computer Graphics International, pp. 466-480 (1998).
H. Vermeulen et al. "Stroley: a Historic and Illustrated Maps Platform," in Proceedings of the Second International Conference on Culture and Computing, pp. 195-196 (2011).
J. Bottger et al. "Map Warping for the Annotation of Metro," Proceedings of IEEE Pacific Visualization 2008 (PacificVlS'08), pp. 199-206, (2008).
J. Kopf et al. "Automatic Generation of Destination Maps," Proceedings of the ACM Special Interest Group on Graphics and Interactive Techniques (SIGGRAPH) Asia 2010, pp. 158:1-158:12 (2010).
J. Kramer. "Abstraction—the key to Computing?" Communications of the ACM, 50(4):36-42 (2007).
J. Lehikoinen and R. Suomela. "Perspective Map," in International Symposium on Wearable Computers 2002, pp. 171-178, (2002).
M. Agrawala et al. "Design Principles for Visual Communication," Communications of the ACM, 54(4):60-69 (2011).
M. Newman. "Maps of the 2012 US presidential election results," http://www.eprsonal.u7mich.edu/~mejn/election/2012, (2012).
T. Nakata and J. Takeuchi. "Mining traffic data from probe car system for travel time prediction," in Proceedings of the 10th ACM Special Interest Group on Knowledge Discovery and Data Mining (SIGKDD) International Conference, pp. 817-822. (2004).
Walk Score. "Walk Score," available at: http://www.walkscore.com/ (2012).
Wikipedia. "Seattle," available at: http://en.wikipedia.org/wiki/Seattle (2012).
Ahmed, Nobbir et al., "Time space transformations of geographic space for exploring analyzing and visualizing transportation systems," J. of Transport Geography 2-17 (2007).
Angel, S. et al., "Urban velocity fields," 2 Envir. and Planning, 211-24 (1970).
Ewing, G. O. et al., "Surface feature interpolation on two-dimensional time space maps," 9 Envir. and Planning 429-37 (1977).
Hyman, G. et al., "On the geometry of emergency service medical provision in cities," Int'l Inst. for Applied Sys. Anal. (working paper) 1-68 (Apr. 1982).
Marchand, B., Deformation of a transportation surface, 63 Annals of the Ass'n. of Amer. Geographers 507-21 (Dec. 1973).

* cited by examiner (a) Intra-class Linking  (b) Inter-class Linking  (c) Obtuse-angle pruning  (d) Acute-angle pruning

VISUAL REPRESENTATIONS OF DISTANCE CARTOGRAMS

CROSS-REFERENCE TO RELATED APPLICATION(S)

This application claims the benefit of U.S. Provisional Application No. 62/171,842, filed Jun. 5, 2015, which is incorporated herein by reference in its entirety.

BACKGROUND

Maps provide an accessible and efficient visualization method for representing geospatial reality. Since maps are configured to reflect real-world geography, individuals can visually determine the Euclidean distance between points on a map. For example, an individual viewing a map representing an urban area, with points of interest connected by available transportation infrastructure (such as walkways, roadways, bus and subway routes, etc.), can visually determine the travel distance between two points based on the total length of a route along the connections multiplied by a scale factor. However, due to various factors such as traffic along the transportation infrastructure, differences in speed limits, weather conditions, and mass-transit schedules, the travel time between different points may vary significantly even when travel distances are substantially the same. As a result, it can be challenging for individuals to predict travel time based on conventional maps.

Various techniques for representing travel times on maps have been used to overcome these shortcomings. For example, some real-time mapping systems have shown roadways with various colors to highlight different levels of traffic congestion in an attempt to enhance geospatial information with geotemporal information. However, colors corresponding to traffic congestion are limited in the precision of information that may be conveyed and require an individual to mentally combine roadways of different colors and different lengths to determine travel time. Alternatively, some systems have generated geographically warped maps in which points on the map are located according to their travel time from other points.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
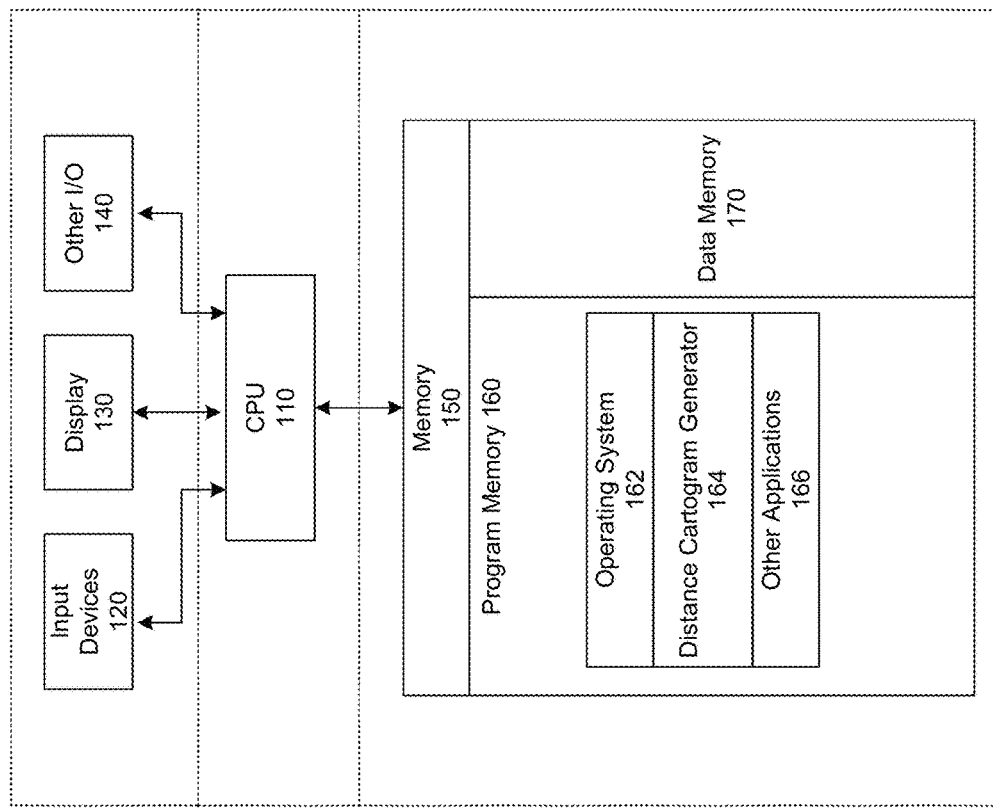
FIG. 1 is a block diagram illustrating an overview of devices on which some implementations can operate.

The present technology is generally directed to methods and systems for generating perceptually-intuitive distance cartograms. A distance cartogram is a specialized map projection that visually conveys a mapping variable, such as travel cost, as a substitute for distance. Specifically, a distance cartogram of travel times (hereinafter, a "distance cartogram") can alter displayed distances between a user-specified origin and other points on a map, with respect to the travel time between them, to allow users to visually decode the travel time between points on the map. However, creating a distance cartogram can be challenging, since unevenly distributed road infrastructure and unpredictable traffic conditions can introduce discrepancies between the actual travel time and the travel distance between locations. For example, a two mile distance between two sets of paired locations in a map can require different times to travel between the pairs of each set. When constructing distance cartograms, these discrepancies can lead to topological violations, which can disrupt the actual geographical relations between the locations and challenge a user's understanding of the distance cartogram. The distance cartograms generated by some embodiments of the described technology attain a higher level of map recognizability by preventing topological violations. The distance cartograms generated according to the described technology can thus convey information about travel time while maintaining geographical context, which improves user comprehension of the travel time information. The distance cartograms can additionally provide graphical projections, or geo-contextual anchors, to preserve geographical context while still indicating the travel-time relationship between points. These geo-contextual anchors improve the recognizability, readability, and utility of the distance cartograms, thereby improving their perceptual quality.

In one example, the system can generate a distance cartogram showing transportation infrastructure in a region, including, for example, walkways, roadways, railways, etc., with the map centered at an origin location. The system can generate the distance cartogram by arranging locations on the map according to a travel cost associated with travel on the transportation infrastructure between those locations and the origin location. For example, the travel cost may be based on the travel time between the points, the infrastructure utilization (e.g., traffic) between the points, weather conditions along the infrastructure between the points, etc. Thus a distance cartogram according to the present example can provide a user with an easily-understood visualization of a cost of travel, such as the estimated time required to travel, to different locations within the illustrated region.

The travel time on which the distance cartogram is based can account for various factors, referred to herein as travel conditions, affecting infrastructure throughput. For example, in transportation infrastructures, travel conditions can include traffic, weather, route closures, vehicle departure frequency, current vehicle speeds or speed limits, stop frequency, and mass-transit schedules. In some embodiments, distance cartograms are generated based on thematic data that characterizes the current travel conditions, expected travel conditions based on historical models, or a combination thereof.

In some embodiments, distance cartograms can be generated by: obtaining geographic information system (GIS) data representing the transportation infrastructure of a region, generating a graph representing the spatial relationships of the transportation infrastructure (e.g., highways and arterial roads) based on the GIS data, receiving travel conditions for the infrastructure, receiving a selection of a location within the graph, and incrementally warping the generated graph to convert the spatial relationships from the selected location to other locations to represent expected travel times between the selected location and other locations, based on the received travel conditions, while augmenting the graph with geo-contextual anchors when the warping creates a topological violation.

Generating the distance cartogram for a region can start by obtaining GIS data representing the transportation infrastructure of the region. The GIS data can describe, for example, roadways, walkways, railways, etc. The GIS data can define each element of the transportation infrastructure using a series of points forming that element. For example, the GIS data can characterize each road in a region by the series of geographic coordinates along which the road runs. The GIS data can also categorize each element of transportation infrastructure. For example, GIS data describing roads can assign a type value to each defined road. In some embodiments, the system assigns each road to a particular class based on the road's type. For example, roads can be assigned to a highway class (hereinafter "H class"), which includes motorway and trunk roads, a road class (hereinafter "R class"), which includes arterial roads such as primary, secondary, and tertiary roads, and a link class (hereinafter "L class"), which link the roads in the H and R classes.

The system can generate a geospatial graph based on the obtained GIS data. As used herein, a "graph" is a spatial representation of an area. The geospatial graph can be a conventional geographically-representative map, in which points on the map are placed according to their relative locations. As an example, the graph can be a representation of a geography containing various transportation infrastructures (roadways, walkways, railways, etc.) upon which people and vehicles travel. The graph can consist of nodes and edges. A node can represent any point within the graph. For example, nodes can represent points corresponding to transportation infrastructure interchanges, points of interest, or other locations defined by the GIS data. Nodes in the graph can be connected to any number of edges, each of which represents a section of the transportation infrastructure. For example, an edge connecting two nodes can represent a section of road connecting two locations on a map. Depending on the particular transportation infrastructure represented by the edge, edges can be uni-directional or bi-directional, can be shown or hidden, can be straight or curved, and can be defined by additional properties such as average speed, speed limit, or a percentage slow-down.

In some embodiments, the obtained GIS data describes the characterized transportation infrastructure as a series of geographical points but does not define any connections between the infrastructure elements. For example, GIS data characterizing a roadway network may define the layout of roads in the network, but may not describe how the roads connect. Therefore the system can use techniques, including intra-class linking and inter-class linking, to generate a graph comprised of nodes and edges from the GIS data. When performing intra-class linking, the system can detect instances in which roads belonging to the same class cross each other, build a link by inserting a node in the graph at the location of the road crossing, and split the crossed road into two edges. When performing inter-class linking, which connects heterogeneous classes in the graph, the system can detect instances in which an L class road overlaps with an H class road or an R class road, build a link by inserting a node at the location of the road crossing, and split the crossed road into edges. Other techniques can be used to build a graph comprised of nodes and edges from the GIS data. After the graph has been built, the system can prune the graph to reduce graph complexity. By performing pruning, the system can produce a graph that represents an infrastructure topology (including junctions and crossroads) with sufficient precision, yet enables simplified calculations of behaviors along the graph topology (e.g., the travel time between locations). For example, the system can perform obtuse-angle pruning, in which a node located between two other nodes is removed when the angle of the three nodes is obtuse ($\pi-x$, where $0° \leq x < 90°$). As a further example, the system can perform acute-angle pruning, in which the system detects instances in which the graph contains multiple chained nodes located within a threshold distance. If any are detected, the nodes are removed and a new node is inserted at the center point of the removed nodes (and connected to the nodes that the chained nodes were previously connected to). Other techniques for pruning graph data can be used. In some embodiments, node placement or node pruning can be based on a determination that an area may have a greater variation in travel times or infrastructure density. For example, for a graph including a representation of a roadway infrastructure, areas such as urban areas, areas that get high rush-hour use, areas commonly subject to inclement weather, or areas with historically high congestion, can be assigned more nodes than other areas with historically consistent travel times. For example, pruning thresholds can be set for such areas so that fewer nodes are pruned.

In some embodiments, the system generates different geospatial graphs corresponding to different zoom levels. The different graphs can include greater or fewer transportation infrastructure elements depending on the level of zoom. For example, a geospatial graph of a roadway network viewed at a first level of zoom may only include highways, while the geospatial graph viewed at a second level of zoom may include local roads. To generate the different graphs, the system can evaluate only certain roads described in the GIS data depending on the road type or class associated with that road. For example, the generation of a zoomed out graph can select only roads classified as H class, an intermediate zoomed graph can select roads classified as H and L class, and a zoomed in graph can select roads classified as H, L, and R class. The system can then generate the corresponding graphs (i.e., creating nodes and edges, as described above) by evaluating the selected roads.

As described herein, the system can generate a distance cartogram by warping a geospatial graph to reflect a travel cost, such as travel time, monetary cost, ecological impact, amount of traffic encountered, etc. The system can generate and maintain different geospatial graphs for different regions. For example, the system can maintain the different geospatial graphs in a data store indexed by region, zoom level, or others. When the system generates a distance cartogram, triggered for example by a user, the system can retrieve the appropriate geospatial graph based on a selected region and zoom level and generate the distance cartogram. For example, the selected region can be based on a location entered by the user, on the user's current location, or some other region as determined by the system.

To generate the distance cartogram, a location on the retrieved geospatial graph can be selected. The selected location can be a user identified point on the graph, a result from a search, a default point such as the center of the current map view area, a system selected point such as an identified accident site, or another point selected by the system or system user. For example, a user can enter his or her current address as the selected location. As another example, a GPS or other location service of the user's computing device can provide a particular current location of the user as the selected location.

The system can also receive thematic data, or infrastructure usage data, that indicates travel conditions on the transportation infrastructure. For example, infrastructure usage data can indicate, for a roadway infrastructure, current vehicular traffic data and accident data. In some embodiments the infrastructure usage data can be gathered from a remote server that monitors current travel conditions, or can be retrieved from data in a database that is updated periodically. In some embodiments the usage data can also be an estimation based on historical data. The infrastructure usage data can take into account other conditions, such as an indicated time of day, a season of the year, a schedule of planned events potentially influencing infrastructure utilization (for example, a parade, concert, or sporting event), and public transportation or mass-transit schedules. In some embodiments the travel conditions can be for the present time, while in other embodiments the travel conditions can be a prediction for a future time using estimations of historical data or extrapolations from current travel conditions.

Based on the infrastructure usage data, the system can calculate travel costs corresponding to travel along the transportation infrastructure (i.e., edges of the graph), between the selected location and one or more nodes of the geospatial graph. For example, the travel costs can be based on travel time along the transportation infrastructure. Using the calculated travel times, the system can determine a warp vector for each node that defines the difference between the geographical location of the node (i.e., the node's location in the geospatial graph) and the node's target position in a distance cartogram (i.e., such that the placement of the node, relative to the selected location, indicates the travel time between the selected location and the node). For example, if the travel time to a first node is calculated to be 5 minutes and travel time to a second node is calculated to be 10 minutes, the magnitude of the resulting warp vectors would indicate that the first and second nodes should be moved such that the distance between the starting location and the second node is twice the distance between the starting location and the first node. Furthermore, the direction of the warp vector for a node can be along the line connecting the selected location of the geospatial graph and the geographic location of the node. Information about calculated travel times to nodes, warp vectors, and other aspects of the described technology, may be found in U.S. Pat. No. 9,341,486 entitled "METHODS AND SYSTEMS FOR PROVIDING GEOTEMPORAL GRAPHS," which is herein incorporated by reference in its entirety. The system can use the warp vectors to generate a distance cartogram by "warping" a geospatial graph. However, as described herein, the system can alter the distance cartogram using geo-contextual anchors when warping of the geospatial graph would create a topological violation.

A topological violation can occur when the travel time-based warping of nodes causes a disruption in the geographical relationship and physical space placement of those nodes. Even if two points are located in close geographic proximity, travel times from a selected location to the two points can differ greatly. For example, the travel distance (as compared to the straight-line or Euclidean distance) to the two points will be generally different, as roads are often irregular and unevenly distributed across a region. In addition, differences in travel conditions, such as different levels of vehicular traffic along routes to the two points, will lead to varied travel times. As geographically proximate nodes are warped (or shifted according to a warp vector), their placement in the graph due to travel time can significantly alter the overall layout of the graph, causing disruptions in the relations between the nodes. Users can find these disruptions jarring or can find a graph difficult to read when the relationship between points on the graph become too dissimilar from the physical space the graph represents. These disruptions, or topological violations, correspond to instances in which nodes cannot be projected in time space (i.e., based on travel time) on a two dimensional plane without the nodes overlapping. The overlaps, which for example could be rendered as overlapping landmasses, impair the ability of a user to recognize the time space visualization. In lieu of warping nodes to locations that create topological violations, the system can use geo-contextual anchors to convey the time space relationship of those nodes. By avoiding topological violations and preserving geographic context, the geo-contextual anchors improve the perceptual quality of the warped graph.

To generate a distance cartogram with geo-contextual anchors, the system can evaluate whether placing a node at the node's target position (as determined by the node's warp vector or travel time) would result in a topological violation. For example, the system can iteratively move the node in discrete steps from its current position (starting at its geographical location in the geospatial graph) to the calculated target position along the node's warp vector, and at each step evaluate whether the updated position would result in a topological violation. The system can detect a topological violation, for example, based on detected changes in edge-intersections among neighboring edges in the graph. If no violation is detected, the process repeats by evaluating the node at its next incremental position along the warp vector until the node is moved to its target position. If a violation is detected, the node's final position in the distance cartogram is set to a position that would not result in a violation (such as, for example, a node position that was evaluated in a previous iteration of moving the node). As described herein, the system can then generate a distance cartogram map by "warping" a geospatial map according to the final position of each node. By doing so, the topological violation is avoided and prevents, for example, the presence of overlapping landmasses in the distance cartogram, thereby improving readability. When the position of the node is set as described to prevent a topological violation, the system can also generate a geo-contextual anchor for that node in the distance cartogram. A geo-contextual anchor is a visual projection that marks the disparity between the node's final position (as set by the system) and the node's target position. For example, the system can display the geo-contextual anchor as an arrow that points from the node's final position to the target position.

After the system updates the positions of one or more nodes according to each node's warp vector and evaluation of topographical violations, the system can update the visual representation of the graph according to each node's updated position. This "warped" map represents points on the map as a function of their travel time to or from the selected starting location. Geo-contextual anchors can then be rendered, for example, as visual overlays superimposed on the deformed landmasses. The resulting distance cartogram can provide users with a readily understandable time-based visualization of a complicated network (e.g., an urban traffic system).

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that generates distance cartograms with geo-contextual anchors. Device 100 can include one or more input devices 120 that provide input to the CPU (processor) 110, notifying it of actions. The actions can be mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, FireWire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, distance cartogram generator 164, and other application programs 166. Memory 150 can also include data memory 170 that can include GIS data describing transportation infrastructure for geographical regions, geospatial graphs, travel conditions, configuration data, settings, user options or preferences, etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
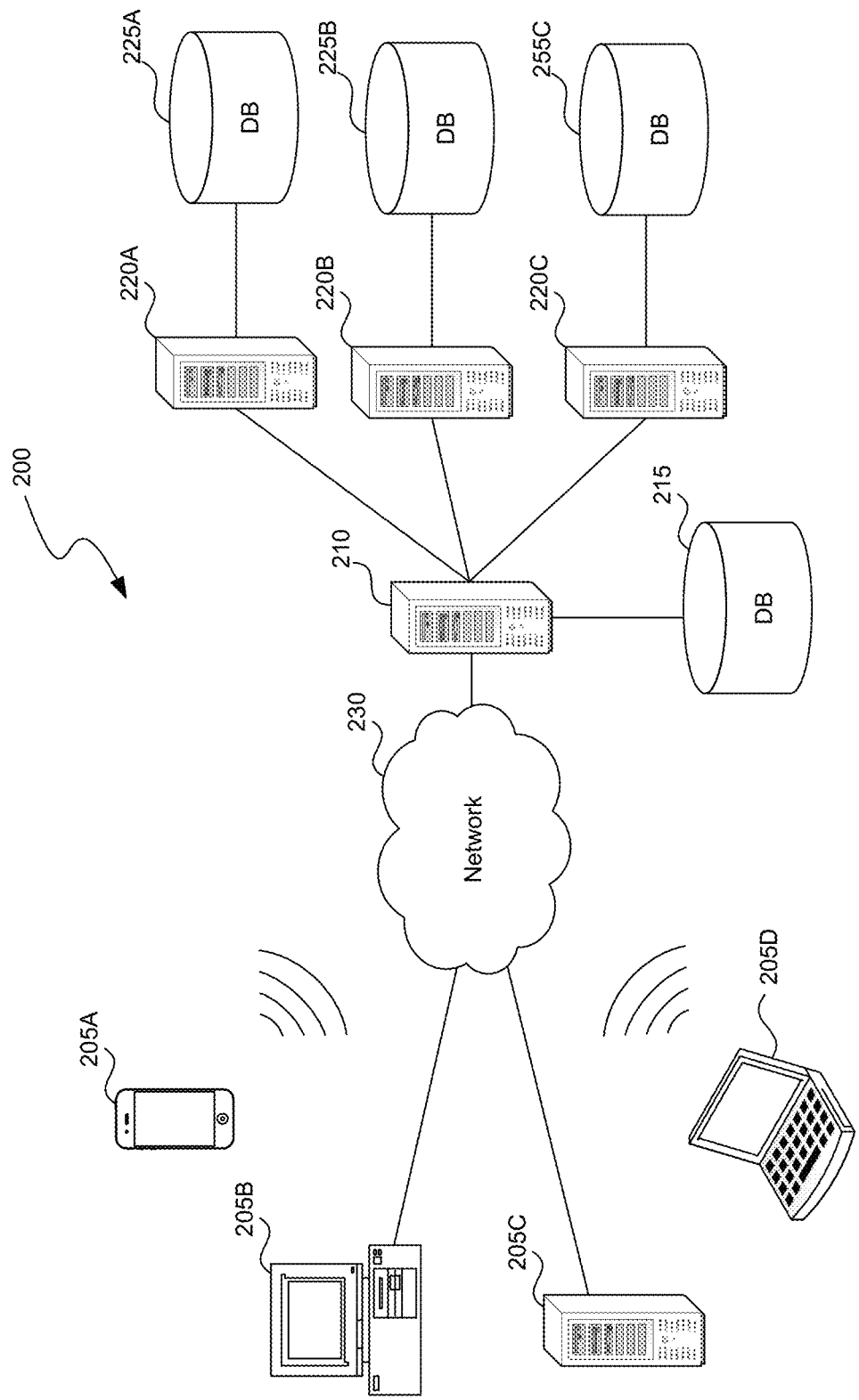
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device 210.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as GIS data, geospatial graphs, and thematic data characterizing travel conditions. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
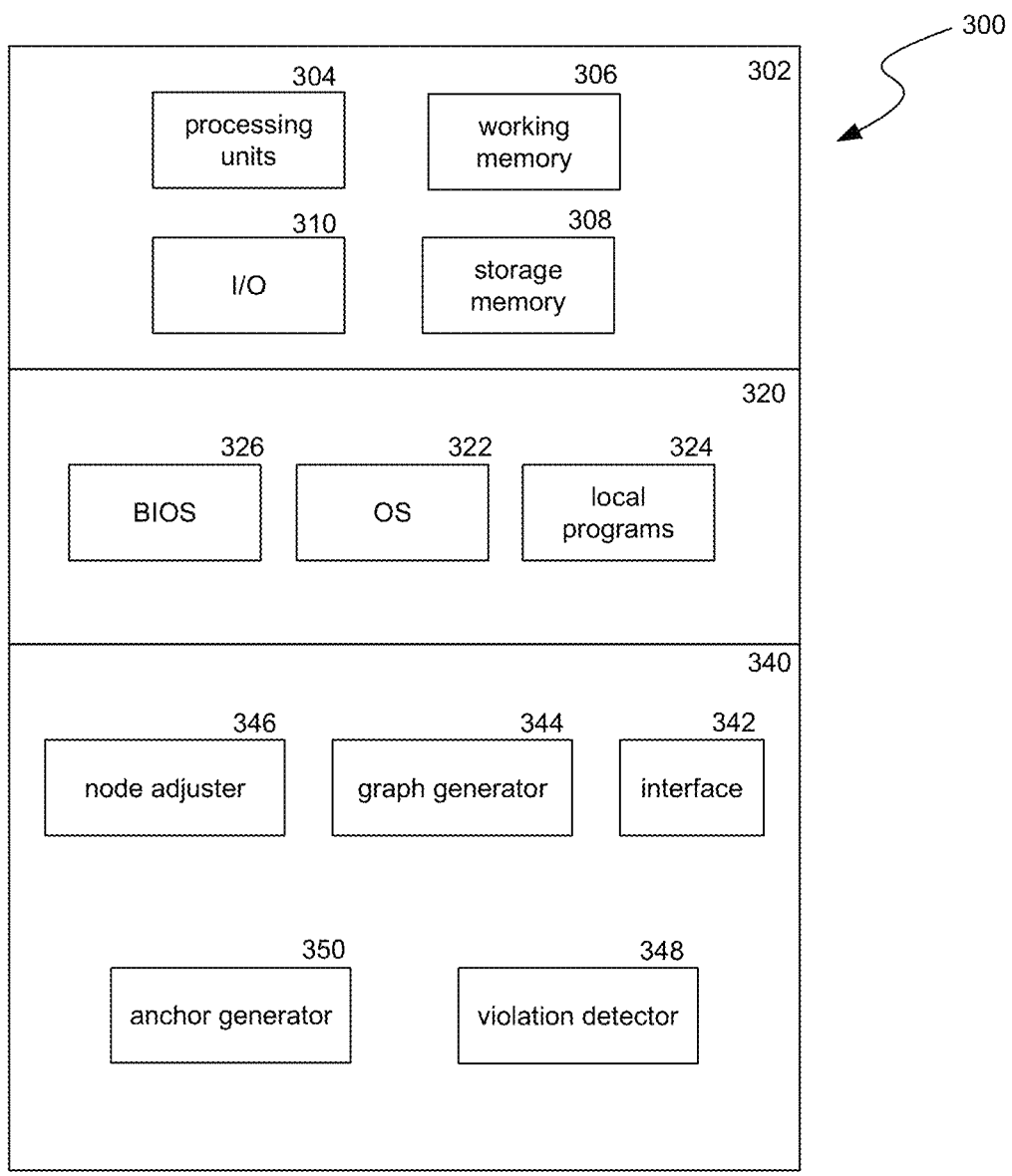
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include graph generator 344, node adjuster 346, violation detector 348, anchor generator 350, and components which can be used for transferring data and controlling the specialized components, such as interface 342. In some implementations, components 300 can be in a computing system that is distributed across multiple computing devices or can be an interface to a server-based application executing one or more of specialized components 340.

User input and data can be received by the interface 342. For example, data from external systems such as current or past travel conditions, data for various graphs such as of road or other transportation infrastructure (e.g., GIS data), and indications of user input indicating interactions with a user interface (UI) such as graph point indications, zoom levels, focus areas, search terms, or time selections can be received by the interface 342.

Graph generator 344 can access, such as through interface 342, transportation infrastructure data, including GIS data and other data describing transportation infrastructures of a region, and generate geospatial graphs for the region. In various implementations, the data describing transportation infrastructures can include roadways, walkways, railways, and public transportation routes. In some implementations, the graph generator 344 can generate a graph by creating nodes representing intersections or interchanges corresponding to the geographic locations at which infrastructure elements overlap. For example, the system can generate a node whenever a local road overlaps with another local road, whenever a highway overlaps with another highway, or whenever a local road or highway overlaps with a connecting road used to link local roads and highways. The generated nodes can be connected by edges, representing the transportation infrastructure created from splitting the overlapped infrastructure elements into corresponding edges. The graph generator 344 can reduce the complexity of the generated geospatial graph by removing nodes from the graph. For example, the system can prune nodes when a series of three nodes form an obtuse angle exceeding a threshold degree or when a series of nodes are placed too close together. The geospatial graphs generated by the graph generator 344 can correspond to different zoom levels that include different elements of the transportation infrastructure. The system can maintain, such as in a memory or database, the geospatial graphs generated by the graph generator 344 for use by the system in generating distance cartograms for display to a user.

The node adjuster 346 can receive an indication of a location selection within a geospatial graph generated by the graph generator 344, and can calculate, for each of the nodes added by graph generator 344, a travel time along the edges of the graph from the selected location to one or more of the other nodes of the graph. The node adjuster 346 can then determine a warp vector for each node indicating how far, and at what angle, the node would have to be moved so that the distance between the node and the selected location is a consistent representation, across all nodes, of the calculated travel time between the node and the selected location. Warp vectors can have the same angle of a line starting at the selected location and continuing to the initial location of the graph node. The warp vectors characterize, in part, how to warp a geospatial graph to generate a distance cartogram.

The node adjuster 346 can additionally iteratively adjust each node from its origin position in the geospatial graph to its target position (based on the warp vector for that node). At each iteration of adjusting a node, the violation detector 348 evaluates the adjusted position of the node to determine whether that position would result in a topological violation. Topological violations in planar graphs embedded in a Euclidean plane are characterized by a change in the edge-intersections of the graph. To determine whether a position adjustment of a node would result in a topological violation, the violation detector 348 finds all edges that are connected to that node. The violation detector 348 then calculates the intersections between the connected edges and the adjacent edges in the graph. For example, the violation detector 348 evaluates whether there has been a change in edge crossings between the connected edges and adjacent edges. To determine an edge crossing, the system can calculate the determinant between two edges. If the determinant between two edges has changed from one iteration to the next, that change indicates a change in an edge crossing, and thus a topological violation. When a topological violation is detected by the violation detector 348, the indication of a violation can be used by the node adjuster 346 to control how or whether to continue iteratively adjusting the node.

The anchor generator 350 can generate geo-contextual anchors for each node in the graph for which a topological violation was detected. Geo-contextual anchors are visual indicators demonstrating the disparity between a node's target position, as calculated by the node adjuster 346, and the node's final adjusted position after accounting for topological violations. For example, the system can generate a geo-contextual anchor that is displayed as an arrow connecting the node's adjusted position and target position. In other words, each geo-contextual anchor is a visual connection between a node's originally calculated target position (i.e., its true value) and where it is actually displayed on the distance cartogram. Geo-contextual anchors can be displayed as other shapes such as a line, a line ending in a circle, a dashed line, etc. The geo-contextual anchors thus enable the precise conveying of the travel time to a node, without obscuring a user's ability to interpret the distance cartogram, such as due to warping a node's position to an extent that topological violations occur.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
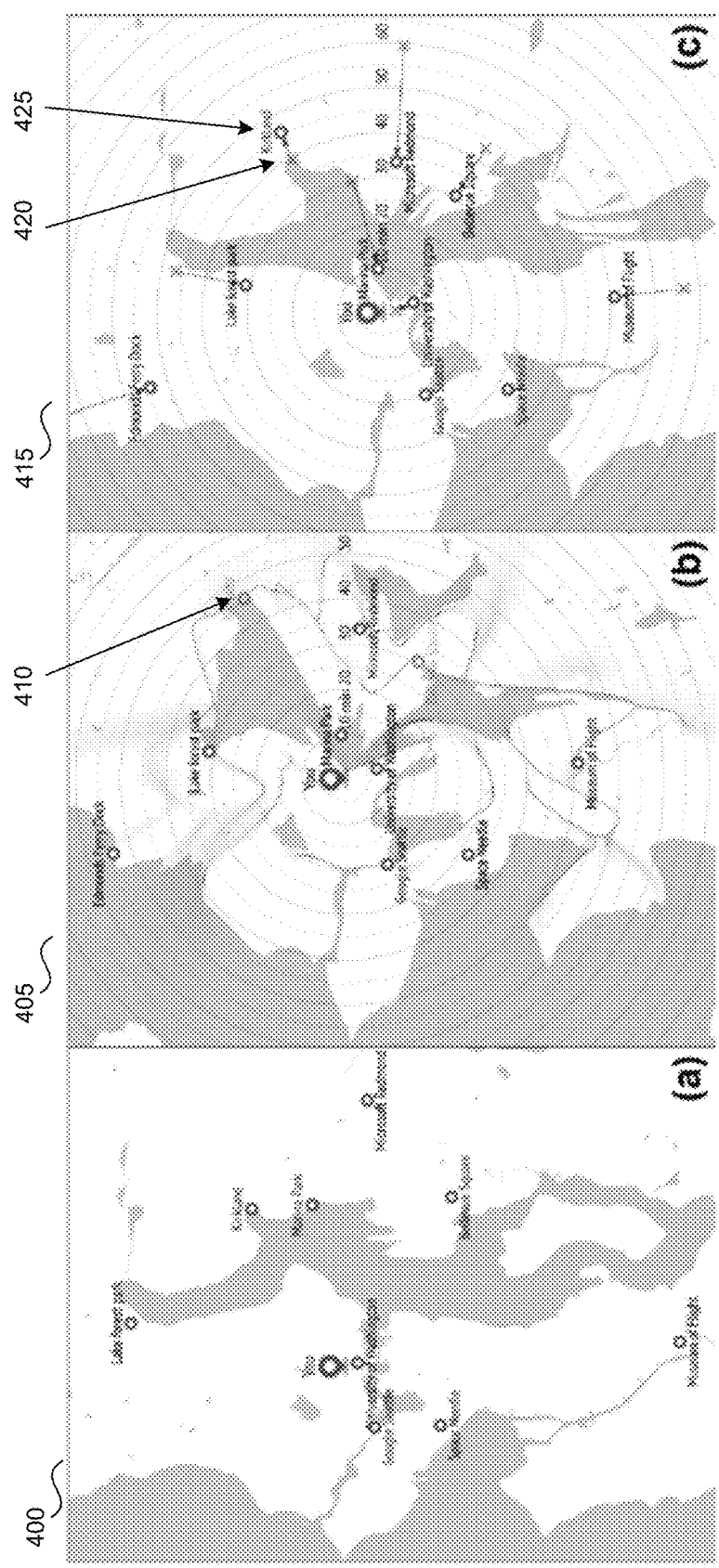
FIG. 4 is an example illustrating assorted map representations of a geographical region.

FIG. 4 is an example illustrating assorted map representations of a geographical region. Graph 400, for example, shows a map of Seattle, Wash., centered at a location north of the University of Washington, using standard cartography. The graph 400 can be based, for example, on geospatial data in which the distances between points on the graph are determined by the geographical distances between those points. Graph 405 shows a map (of the same region mapped in graph 400) warped according to travel time to or from the centered location. For example, travel time can be based on travel by roadway (not shown) from the centered location. Due to warping, however, the graph 405 contains topological violations expressed as overlapping landmasses. For example graph location 410, which represents Kirkland, Wash., is obstructed by an overlapping landmass. As a result of the obstruction, a user may have difficulty understanding the travel time to Kirkland from the centered location. The user may also have difficulty understanding the correspondence between points as represented in the graph 405 and their actual geographical location, thereby rendering the representation unfamiliar and additionally difficult to understand. Graph 415 shows a distance cartogram, of the same region and according to the same travel conditions of the graph 405, as generated by an embodiment of the described system. However, while the points on the graph 415 have been adjusted to convey travel time (as was done in graph 405), the adjustments of graph 415 have been limited so as to not cause topological violations. For example, graph location 420 represents an adjusted location of Kirkland, Wash. that avoids creating a topological violation by limiting the extent to which the map is warped. Though not placed at the actual location based on travel time, the location 420 still contributes to a warped map that conveys the travel time to places while retaining a geographical correspondence, which improves map familiarity and usability. In other words, though the graph 415 is warped as compared to the standard graph illustrated by graph 400, the geographical features of graph 415 are nonetheless recognizable. The graph 415 also includes geo-contextual anchor 425, associated with location 420, indicating the actual travel time to Kirkland, Wash. Though the anchor 425 represents the actual travel time to Kirkland, the distance cartogram represented by graph 415 does not warp according to the placement of anchor 425. In other words, the geo-contextual anchor may be thought of as an overlay that augments the distance cartogram with additional information regarding travel time to locations.

Figure 5:
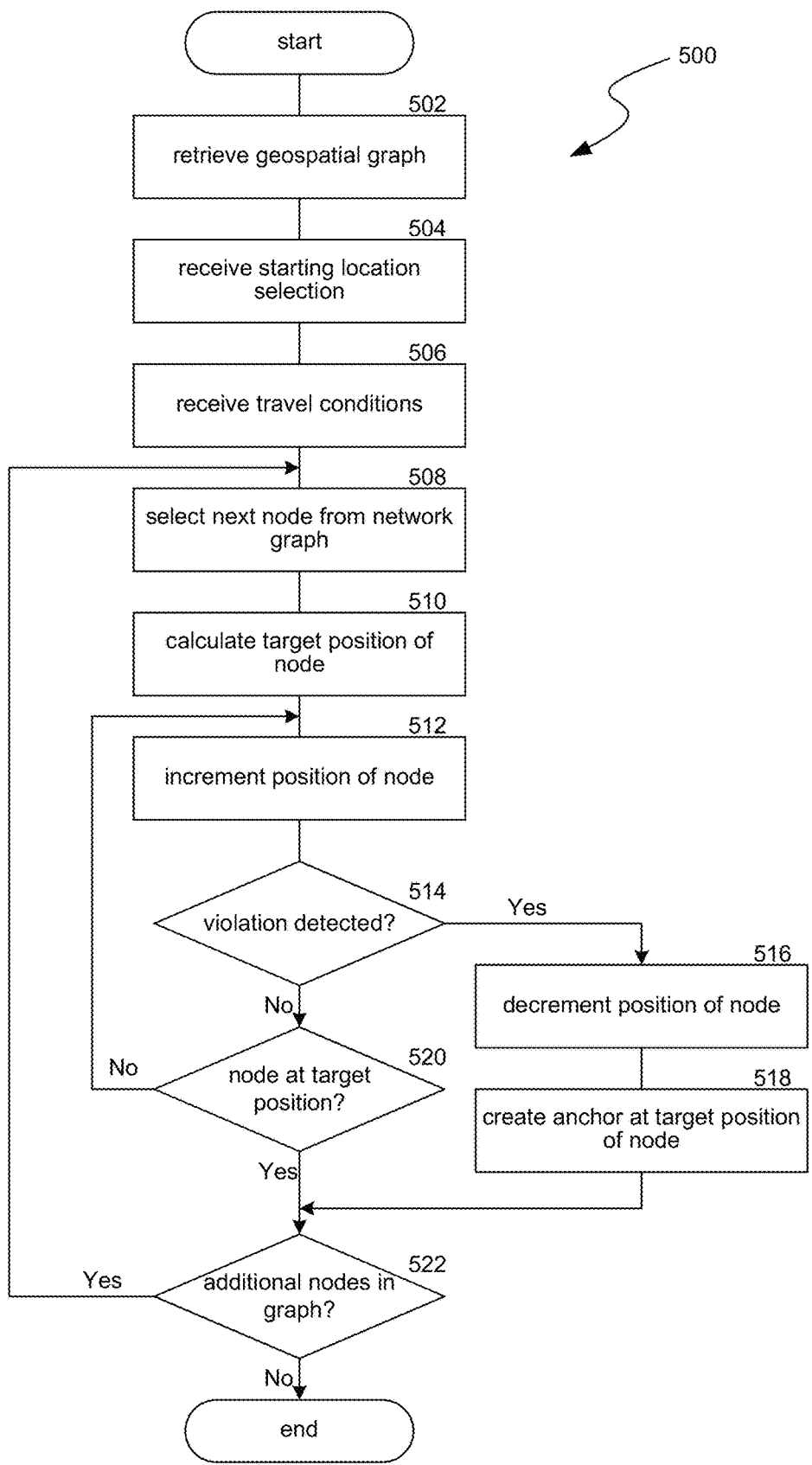
FIG. 5 is a flow diagram illustrating a process used in some implementations for generating a distance cartogram with perceptual anchors.

FIG. 5 is a flow diagram illustrating a process 500 used in some implementations of a system for generating a distance cartogram with perceptual anchors. At block 502, process 500 can retrieve a geospatial graph. The geospatial graph may describe the transportation infrastructure of a region, in which points of the graph are placed according to their geographical relationships. The retrieved geospatial graph can be for a particular region, and at a particular level of zoom, according to the instruction of, for example, a user. Process 500 can retrieve the geospatial graph from a database or other data store where geospatial graphs for the region and other regions, at various levels of zoom, can be maintained.

At block 504, process 500 can receive the selection of a starting location within the geospatial graph. The selected starting location can be a user identified point on the graph, the result from a search, a default point such as the center of a current view area, a system selected point (such as an identified accident site), or another point selected by a system or system user.

At block 506, process 500 can receive travel conditions. As described above, travel conditions may comprise, for example, data indicating travel throughput through the transportation infrastructure (i.e., traffic conditions) as well as other factors influencing travel time.

At block 508, process 500 can select a node (other than the selected starting location) from the geospatial graph. At block 510, process 500 can calculate a target position for the selected node based on the travel time, between the selected node and the selected starting location, along the transportation infrastructure. The travel time can also be based on the travel conditions of the transportation infrastructure. For example, process 500 can determine which path between the two points is quickest and calculate the travel time for that path. The target position for the node is then set according to the calculated travel time. The node's target position can be expressed as an absolute map coordinate, as a relative map coordinate (for example, relative to the starting location), as a vector defining a change in node location relative to the node's location in the geospatial graph, etc. For example, process 500 can determine a warp vector for the node indicating how far, and along which angle, the node would have to be moved so that the distance between the node and the starting location yields a consistent representation, across all nodes, of the calculated travel time between the starting location and other nodes.

As described below, at blocks 512-520, process 500 can determine a new position for the selected node, starting from the selected node's initial position in the geospatial graph. The new position for the selected node can be based on the travel time between the selected node and starting location while avoiding topological violations. At block 512, process 500 can incrementally adjust the position of the selected node from its current location towards the node's target location. Prior to any adjustments, the selected node's initial location may, for example, be its geographic placement in the geospatial graph. The incremental adjustment of the selected node can be along the direction of a warp vector for the node and by a specified amount. For example, process 500 can be configured with a step amount that balances a fine-grain adjustment of the selected node along the selected node's warp vector without requiring an unduly expensive number of evaluations.

At a decision block 514, process 500 can determine whether the adjusted position of the selected node results in a topological violation. A topological violation occurs when the adjusted position of the selected node alters the planarity of the graph (i.e., creates a situation in which the geography of the graph cannot be expressed without causing, for example, overlapping landmasses). Process 500 can determine that a topological violation occurred if the change in the selected node's position (caused by the adjustment) results in a change in the number of edge intersections in the graph. For example, process 500 can identify all edges that are connected to the selected node. After the adjustment of the selected node's location, process 500 can calculate the number of intersections between the identified connected edges and the adjacent edges in the graph. Process 500 can determine whether there was a change in edge intersections in the graph (which indicates a topological violation) by, for example, taking the determinant between two edges and evaluating whether the determinant changed from a previous iteration (before the present adjustment).

If at decision block 514 process 500 determines that there is no topological violation, process 500 continues to decision block 520. At decision block 520, process 500 can determine whether the adjusted position of the selected node is equal to or within a threshold distance of the selected node's target position (as determined by block 510). If process 500 determines that the adjusted position and target position of the selected node are equivalent (or within a threshold distance), then the selected node has successfully been moved to its target position and no further adjustment of the selected node is necessary. Accordingly, process 500 continues to decision block 522 to determine whether there are additional nodes in the geospatial graph that require warping. If, however, process 500 determines at decision block 520 that the selected node's adjusted position does not match its target position, process 500 returns to block 512 for further adjustment of the selected node.

Returning to decision block 514, if process 500 determines that the adjustment caused a topological violation, processing continues to block 516. At block 516 process 500 can adjust the position of the selected node to avoid the topological violation. For example, process 500 can decrement the position of the selected node along the selected node's warp vector by the same amount as the most recent adjustment, thereby restoring the selected node to its prior position (where it is known there was no topological violation). As a further example, process 500 can repeatedly decrement the position of the selected node along the node's warp vector by an amount smaller than the most recent adjustment until process 500 determines that the topological violation has been removed. A final adjusted position for the node is then set based on the adjustments at the conclusion of block 516. Process 500 then continues to block 518 where it can generate a geo-contextual anchor representing the disparity between the selected node's target position and the selected node's final adjusted position in the distance cartogram. For example, the geo-contextual anchor can be a visual arrow rendered with the graph that shows the placement of the selected node's target position relative to the selected node's adjusted position. Process 500 then continues to decision block 522.

At decision block 522, process 500 can determine whether there are additional nodes in the geospatial graph that should be warped according to travel time. If there are, process 500 returns to block 508 where process 500 sets the next node in the graph as the selected node to be operated on by the loop between blocks 508-522. If there are not additional nodes in the geospatial graph that should be warped according to travel time, process 500 ends.

Figure 6A:
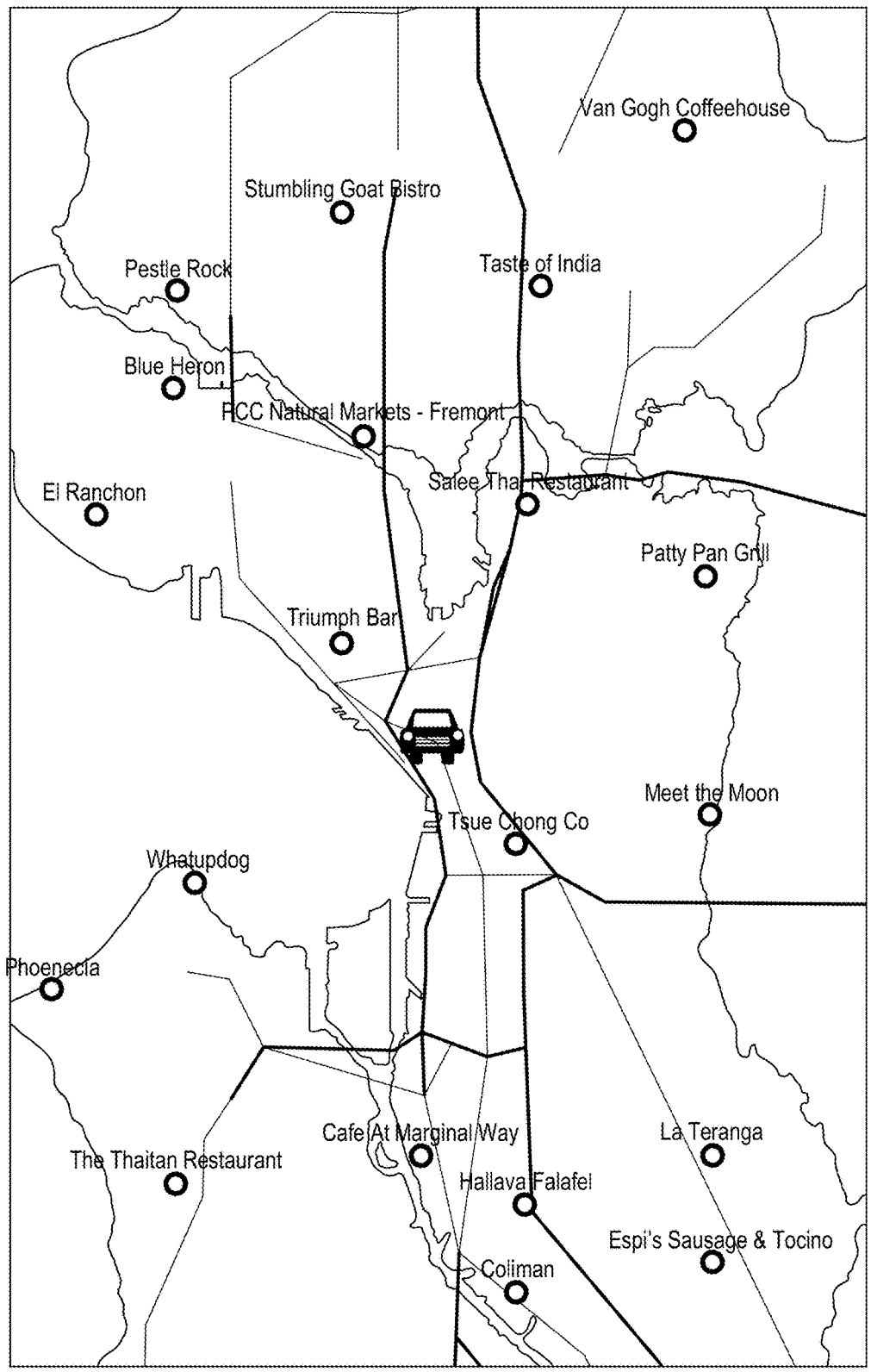
FIGS. 6A-6C illustrate an example distance cartogram, with perceptual anchors, as it is generated from a map of a region.
Figure 6B:
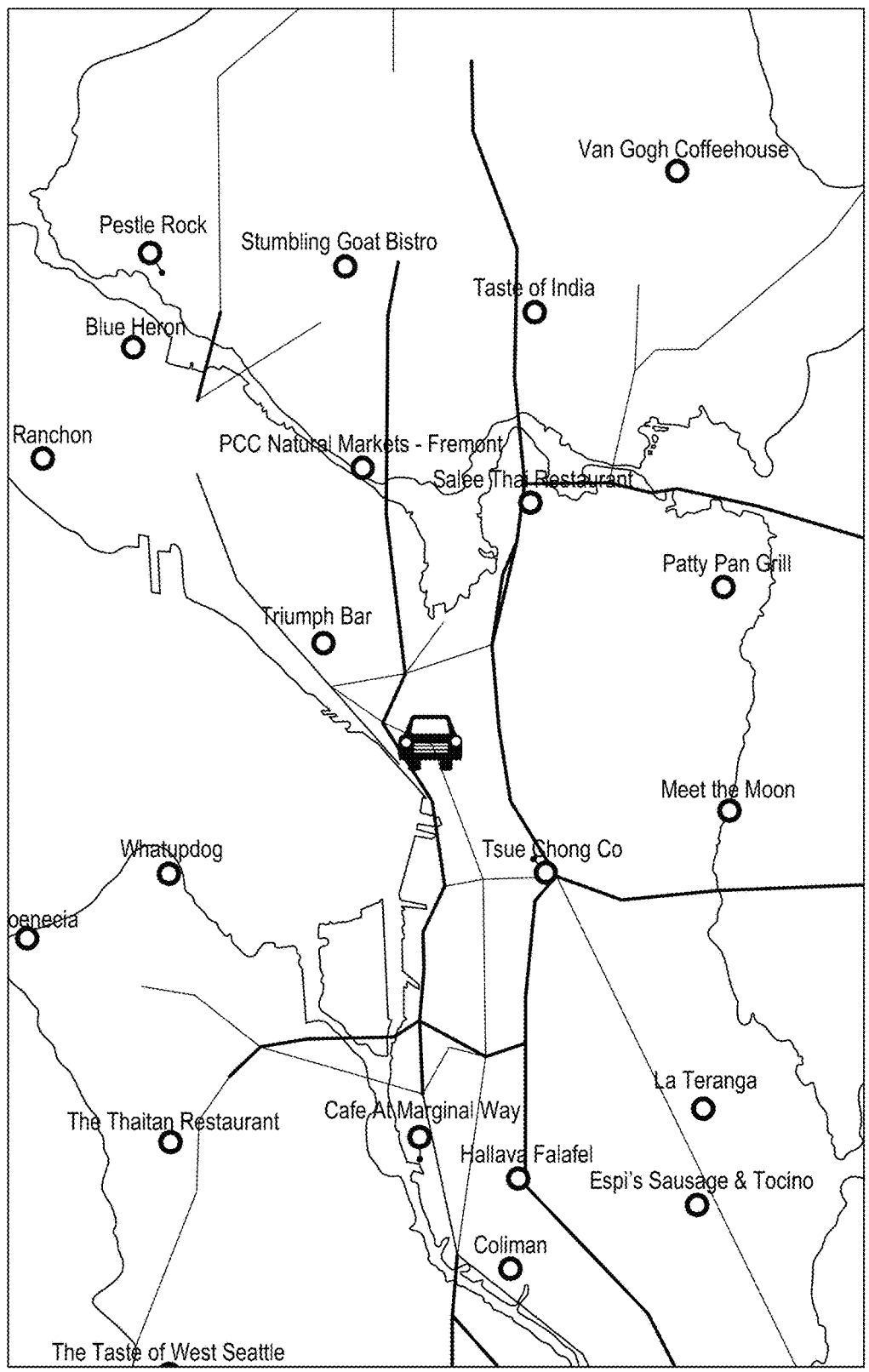
Figure 6C:
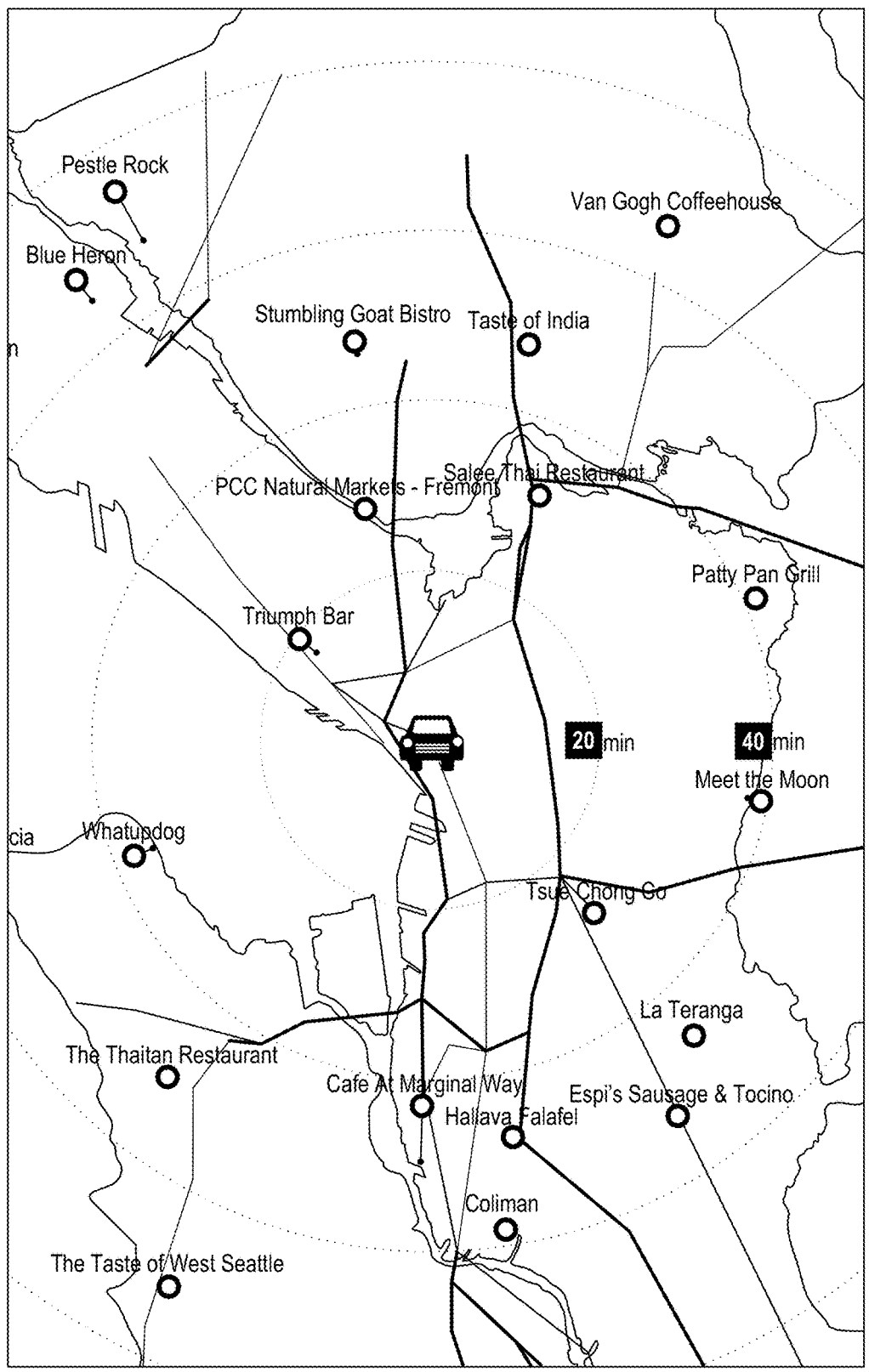

FIGS. 6A-6C illustrate an example distance cartogram, with perceptual anchors, as it is generated from a map of a region. FIG. 6A shows a conventional map in which points on the map are placed according to their geographic distances from one another. The map includes a starting location (indicated by the icon of a car) and various points of interest (indicated by circles and location names) in the region. The map also includes transportation infrastructure, such as roads. FIG. 6B shows an intermediate representation of the region as points on the map begin to shift according to their travel time from the starting location. FIG. 6C shows a final distance cartogram. Notably, as the map first warps in FIG. 6B, and then becomes more pronounced in FIG. 6C, the underlying geography reflected in FIG. 6A is still recognizable to a user.

Figure 7:
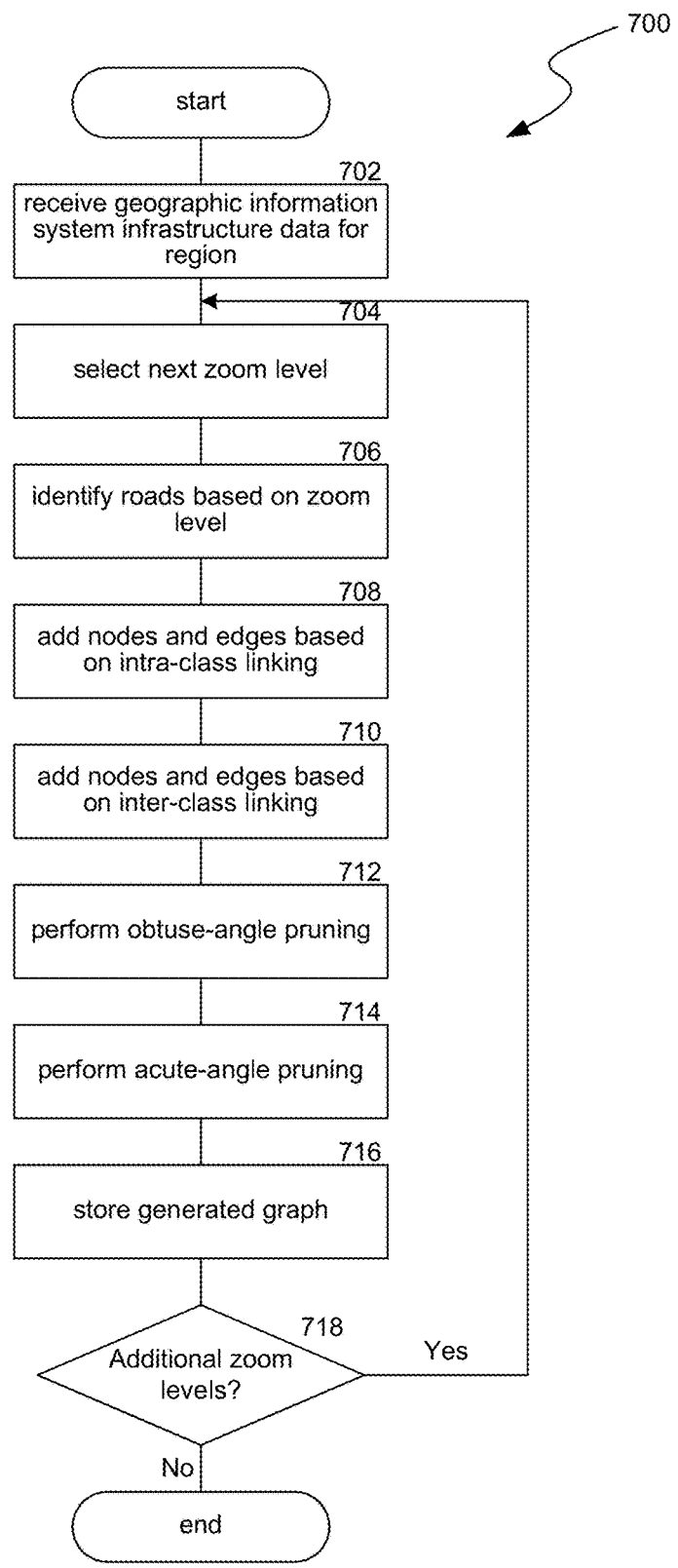
FIG. 7 is a flow diagram illustrating a process used in some implementations for generating a geospatial graph from geographic information system data.

FIG. 7 is a flow diagram illustrating a process 700 used in some implementations of a system for generating a geospatial graph from geographic information system data. At block 702, process 700 can receive geographic information system (GIS) data describing the transportation infrastructure for a region. For example, the GIS data may describe roadways, walkways, railways, and other elements of transportation infrastructure. In addition to being characterized as, for example, roadways, walkways, and railways, the system can further classify elements, such as into different classes of roadways (e.g., streets, highways, linking roads, etc.). The GIS data may characterize the geographical routes of the different transportation infrastructure elements, but may not describe how they connect (e.g., may not describe street-level intersections, highway interchanges, etc.).

At block 704, process 700 can select a zoom level. As described above, process 700 can generate geospatial graphs corresponding to different levels of zoom, such as zoomed in to street level, or zoomed-out to regional level.

At block 706, process 700 can identify transportation infrastructure elements, from the GIS data, for inclusion in the geospatial graph. In some implementations, the infrastructure elements can be identified based on the selected zoom level. For example, process 700 can omit local streets when generating a zoomed out geospatial graph.

Figure 8:
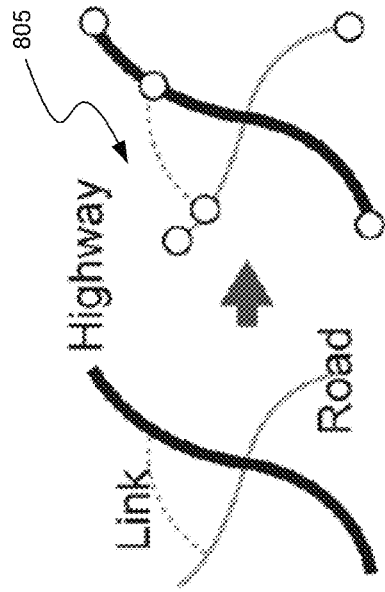
FIG. 8 is an example illustrating adding and pruning nodes of a geospatial graph.
Figure 8:
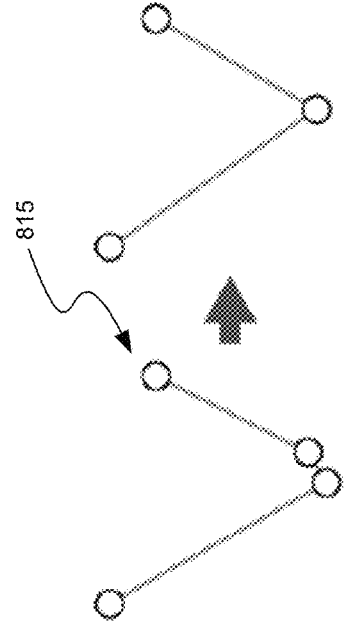
Figure 8:
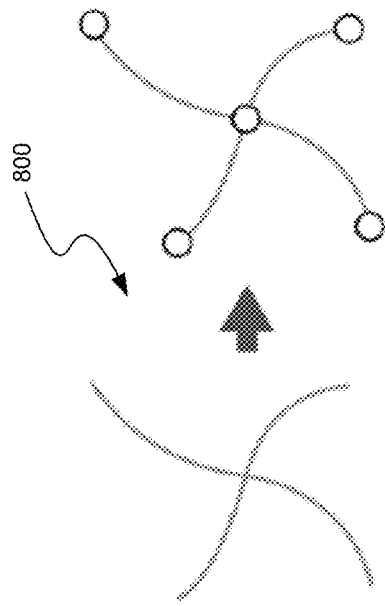
Figure 8:
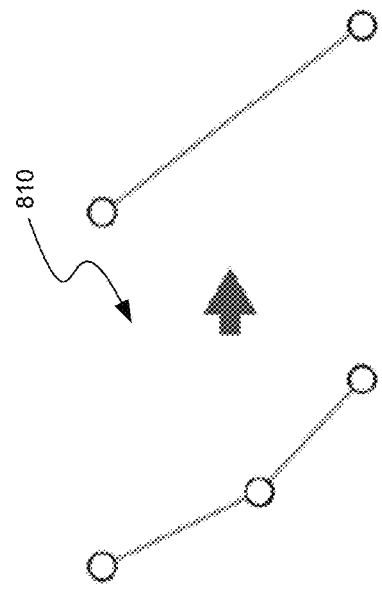

At blocks 708 and 710 process 700 can build the initial geospatial graph by generating nodes and edges based on infrastructure elements identified at block 706. At block 708, process 700 can perform intra-class linking. As illustrated by example 800 of FIG. 8, intra-class linking identifies overlaps of infrastructure elements of the same class (e.g., two roads overlapping). At the point of overlap, a node is inserted and edges are created where the element is split. Returning to FIG. 7, at block 710, process 700 can perform inter-class linking. As illustrated by example 805 of FIG. 8, inter-class linking identifies overlaps with connective infrastructure. For example, where a link overlaps with a highway or a road, process 700 can insert a node at the point of overlap and create edges for the split infrastructure. In some implementations, process 700 does not insert a node at non-connective overlaps. For example, no node may be inserted where a road overlaps a highway.

Returning to FIG. 7, at blocks 712 and 714, process 700 can prune the generated graph to reduce graph complexity. At block 712 process 700 can perform obtuse-angle pruning. As illustrated by example 810 of FIG. 8, obtuse-angle pruning identifies instances in which three nodes form an obtuse angle exceeding a system-specified threshold. The middle node is then removed, and the remaining nodes are connected with a replacement edge. Returning to FIG. 7, at block 714 process 700 can perform acute-angle pruning. As illustrated by example 815 of FIG. 8, acute-angle pruning identifies instances in which the graph contains nodes located within a threshold distance of each other. If any are detected, the nodes are removed and a new node is inserted at the center point of the removed nodes (and connected to the nodes that the chained nodes were previously connected to).

Returning to FIG. 7, at block 716, the generated geospatial graph can be stored, such as in a database or other data store. The stored graph can be retrieved at a later time to, for example, display a conventional map to a user, as a basis for a distance cartogram of the corresponding geography, or for other purposes. Process 700 then continues to decision block 718.

At decision block 718, process 700 can determine whether there are additional zoom levels for which process 700 will generate a geospatial graph. For example, process 700 can be configured to generate graphs at three zoom levels (high, medium, and low) for a region. If it is determined that there are additional zoom levels for which graphs should be generated, process 700 returns to block 704 and selects the next zoom level. Otherwise process 700 ends.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiples of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for generating a distance cartogram, the method comprising: retrieving a graph comprising multiple nodes and connected edges, wherein each node represents an intersection or interchange, wherein each edge represents a segment of a transportation infrastructure, wherein the graph is a spatial representation of an area and wherein each node has an initial position based on its geographic location within the area; receiving a selection of a location within the graph; determining, for a selected node of the multiple nodes, a travel-time based position of the selected node by: determining a target position of the selected node based on a travel time between the geographic location corresponding to the selected node and the location within the graph; iteratively, until a topological violation is detected, adjusting a current position of the selected node, from the initial position of the selected node towards the target position of the selected node; and in response to the detection of the topological violation, refining the current position of the selected node by: setting the current position of the selected node to a position of the selected node from an iteration prior to the detection of the topological violation; wherein the topological violation corresponds to a disruption of the geographical relation between the current position of the selected node and a position of a second node of the multiple nodes of the graph, and generating a graphical projection indicating a connection between the current position of the selected node and the target position of the selected node; and generating a distance cartogram based on the current position of the selected node and the generated graphical projection.

2. The method of claim 1, further comprising receiving travel condition data for the area of the graph, and wherein the travel time, based on which the target position of the selected node is determined, is calculated using the received travel condition data.

3. The method of claim 2, wherein the travel condition data comprises vehicular traffic conditions.

4. The method of claim 1, wherein the travel time between the selected node and the selected location is based on an expected time to travel between the corresponding intersections or interchanges along the corresponding transportation infrastructure.

5. The method of claim 4, wherein the transportation infrastructure comprises one or more of: roadways, walkways, railways, or any combination thereof.

6. The method of claim 1, wherein the topological violation is detected by:
determining a number of edge-intersections, among a set of edges from the graph, based on the position of the selected node in the current iteration;
comparing the determined number of edge-intersections to a previous number of edge-intersections among the set of edges from the graph, wherein the previous number of edge-intersections is based on the position of the selected node from a previous iteration; and
identifying a topological violation based on a change in the current number of edge-intersections and the previous number of edge-intersections.

7. The method of claim 6, wherein the set of edges comprises all edges connected to the selected node and all edges adjacent to the connected edges.

8. The method of claim 6, wherein an edge-intersection between two edges is detected based on a determinant of the two edges.

9. A computer-readable storage medium storing instructions that, when executed by a computing system, cause the computing system to perform operations for providing a mapping associated with thematic data, the operations comprising: obtaining a graph, wherein the graph comprises multiple nodes and is a spatial representation of an area, wherein each node represents an intersection or interchange of a transportation infrastructure, wherein each node has an initial position corresponding to a geographical location; receiving thematic data characterizing a travel-cost associated with travel between at least two nodes of the graph; determining, based on the thematic data, a target position for a selected node of the multiple nodes; incrementally adjusting the selected node in the graph, wherein each incremental adjustment comprises: determining an incremental position for the selected node relative to a current position of the selected node, the incremental position being located towards the target position of the selected node relative to the current position; detecting whether the incremental position violates a topology of the graph; and setting the current position to a modified target position for the selected node when a topology violation is detected; generating a graphical projection indicating a connection between the target position and the modified target position of the selected node resulting from the incremental adjusting; and generating a distance cartogram based on the modified target position of the selected node and the generated graphical projection.

10. The computer-readable storage medium of claim 9, wherein at least one of the incremental adjustments comprises providing a geo-contextual anchor between the target position and the modified target position of the selected node when a topology violation is detected, and wherein the mapping is further based on the geo-contextual anchor.

11. The computer-readable storage medium of claim 9, wherein each incremental adjustment further comprises setting the current position of the selected node to the incremental position when a topology violation is not detected.

12. The computer-readable storage medium of claim 11, wherein the incremental adjustment of the selected node repeats until a topology violation is detected or the current position of the selected node matches the target position of the selected node.

13. The computer-readable storage medium of claim 9, wherein the travel-cost associated with travel between nodes of the graph is based on the time to travel between the nodes.

14. The computer-readable storage medium of claim 9, wherein the travel-cost associated with travel between nodes of the graph is based on locomotion data.

15. A system including at least one processor and memory for generating a distance cartogram, the system comprising: an interface module configured to: obtain a graph, wherein the graph comprises multiple nodes and is a spatial representation of an area, wherein each node represents an intersection or interchange of a transportation infrastructure, and wherein each node has an initial position corresponding to a geographical location; receive thematic data characterizing travel-cost associated with travel between at least a designated origin node of the graph and a selected node of the graph; and generate a map based on the graph as modified by a node adjuster; the node adjuster configured to: determine, based on the thematic data, a target position for the selected node; and incrementally adjust the selected node in the graph, wherein each incremental adjustment comprises: determining an incremental position for the selected node relative to a current position of the selected node, the incremental position being located towards the target position of the selected node relative to the current position; and setting, based on an evaluation of the graph by a violation detector, the current position of the selected node to a modified target position when a topology violation is detected; wherein the topological violation corresponds to a disruption of the geographical relation between the current position of the selected node and a position of a second node of the multiple nodes of the graph, and the violation detector configured to: detect whether the incremental position of the selected node violates a topology of the graph; generating a graphical projection indicating a connection between the target position and the modified target position of the selected node resulting from the incremental adjusting; and generating a distance cartogram based on the modified target position of the selected node and the generated graphical projection.

16. The system of claim 15, the system further comprising:
an anchor generator configured to:
generate a geo-contextual anchor between the target position and the modified target position of the selected node when a topology violation is detected;
and wherein the map generated by the map generator is further based on the geo-contextual anchor.

17. The system of claim 16, wherein the geo-contextual anchor is displayed as a line, a line ending in a circle, or a dashed line between the target position and the modified target position of the selected node.

18. The system of claim 15, wherein the detection of a topology violation is based on a change in the number of edge-intersections, among a set of edges from the graph, caused by the incremental adjustment of the selected node, wherein each edge represents a segment of the transportation infrastructure.

19. The system of claim 18, wherein the set of edges comprises all edges connected to the selected node and all edges adjacent to the connected edges.

* * * * *

UNITED STATES PATENT AND TRADEMARK OFFICE
CERTIFICATE OF CORRECTION

PATENT NO. : 9,773,321 B2  
APPLICATION NO. : 15/174791  
DATED : September 26, 2017  
INVENTOR(S) : Sungsoo Hong et al.

Page 1 of 1

It is certified that error appears in the above-identified patent and that said Letters Patent is hereby corrected as shown below:

On the Title Page

In item (57), in Column 2, in "Abstract", Line 17, delete "but-for" and insert -- but for --, therefor.

On the page 2, in Column 2, under "Other Publications", Line 62, delete "Useer's" and insert -- User's --, therefor.

On the page 2, in Column 2, under "Other Publications", Line 63, delete "Activites," and insert -- Activities, --, therefor.

Signed and Sealed this  
Twenty-first Day of November, 2017

Joseph Matal  
*Performing the Functions and Duties of the*  
*Under Secretary of Commerce for Intellectual Property and*  
*Director of the United States Patent and Trademark Office*